(12) United States Patent
Futami

(10) Patent No.: US 7,800,792 B2
(45) Date of Patent: Sep. 21, 2010

(54) IMAGE READING METHOD AND IMAGE READING APPARATUS

(75) Inventor: Hiroyuki Futami, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1060 days.

(21) Appl. No.: 11/501,524

(22) Filed: Aug. 9, 2006

(65) Prior Publication Data

US 2007/0121175 A1 May 31, 2007

(30) Foreign Application Priority Data

Nov. 30, 2005 (JP) .............................. 2005-345447

(51) Int. Cl.
*H04N 1/04* (2006.01)
(52) U.S. Cl. ..................... 358/474; 358/448; 358/468
(58) Field of Classification Search .................. None
See application file for complete search history.

(56) References Cited

U.S. PATENT DOCUMENTS

| | | | | |
|---|---|---|---|---|
| 4,278,334 A | * | 7/1981 | Maeda | 353/85 |
| 4,299,475 A | * | 11/1981 | Nagahara | 399/200 |
| 4,943,870 A | * | 7/1990 | Sugishima | 358/451 |
| 6,032,864 A | | 3/2000 | Hamasuna | |
| 6,256,473 B1 | * | 7/2001 | Kamanuma et al. | 399/367 |
| 6,292,594 B1 | * | 9/2001 | Iwai | 382/298 |
| 6,400,854 B1 | * | 6/2002 | Kudoh | 382/317 |
| 6,735,000 B2 | * | 5/2004 | Shimomura et al. | 358/509 |
| 7,002,711 B2 | * | 2/2006 | Tsutsumi | 358/412 |
| 7,460,280 B2 | * | 12/2008 | Nakagawa | 358/486 |

FOREIGN PATENT DOCUMENTS

| | | |
|---|---|---|
| JP | 05-326919 A | 12/1993 |
| JP | 07-107237 A | 4/1995 |
| JP | 10-190989 | 7/1998 |
| JP | 2000-224380 A | 8/2000 |
| JP | 2000-332959 A | 11/2000 |
| JP | 2005-208298 A | 8/2005 |

OTHER PUBLICATIONS

European Search Report and Written Opinion (in English) dated Nov. 3, 2009 issued in a counterpart European Application No. 06254128.9.

Japanese Office Action dated Jul. 13, 2010 and English translation thereof, issued in counterpart Japanese Application No. 2005-345447.

* cited by examiner

*Primary Examiner*—Mark K Zimmerman
*Assistant Examiner*—Dung D Tran
(74) *Attorney, Agent, or Firm*—Frishauf, Holtz, Goodman & Chick, P.C.

(57) ABSTRACT

Disclosed is an image reading method for reading an image on a document, including: reading cyclically the image in a main scanning direction with using an image pickup section, while relatively moving at least one of a light emitting section and the document irradiated by the light emitting section with a sub-scanning velocity in a sub-scanning direction perpendicular to the main scanning direction, against the image pickup section which comprises a plurality of light receiving elements in the main scanning direction; controlling, while the cyclic reading, a reading cycle in the main scanning direction to be inversely proportional to a magnification ratio; controlling, while the cyclic reading, light emitting intensity and light emitting period in the reading cycle to be constant irrespective of the magnification ratio; and controlling, while the cyclic reading, the sub-scanning velocity to be constant irrespective of the magnification ratio.

10 Claims, 5 Drawing Sheets

IMAGE READING METHOD AND IMAGE READING APPARATUS

CROSS REFERENCE TO RELATED APPLICATION

The present application is based on Japanese Patent Application No. 2005-345447 filed with Japan Patent Office on Nov. 30, 2005, the entire content of which is hereby incorporated by reference.

BACKGROUND OF THE INVENTION

1. Field of the Invention

The present invention relates to an image reading method and an image reading apparatus for periodically reading an image on a document irradiated by a light emitting source in the main scanning direction by an image pickup sensor having a plurality of light receiving elements in a main scanning direction while relatively moving at least one of the light emitting source and the document against the image pickup element in a sub-scanning direction.

2. Description of Prior Art

There is an image reading apparatus for reading an image on a document irradiated by a light emitting source having a plurality of light emitting elements in the main scanning direction through an image pickup sensor, such as a line sensor, while relatively moving a light emitting source and the image pickup sensor against the document in the sub scanning direction.

In the image reading apparatus described above, there is an image reading apparatus having a reduction function for generating reduced size image data. With regard to the reduction function of the image forming apparatus, the technologies related to the reduction function are disclosed in FIG. 1 on page 1 of Japanese Unexamined Laid-Open Patent Publication No. 2000-224380.

(A) The conventional reduction function of the image reading apparatus has been executed by the method described below.

(A1) Motor Control:

When simply executing the reduction function, a control section of the image reading apparatus controls the scanning velocity in the sub-scanning direction Sv' to be inversely proportion to a magnification ratio α against the scanning velocity Sv at the real size operation. This will be expressed by a following formula (1).

$$Sv' = Sv/\alpha \qquad (1)$$

For example, assume that the sub-scanning velocity Sv at the non-magnification equals to 465 mm/s, the scanning velocity in the sub-scanning direction Sv' is going to be 930 mm/s when reducing a magnification ratio to 50%, because Sv'=465/0.5=930.

Graph (a) in FIG. 7 illustrates the scanning velocity in the sub-scanning direction when scanning in a reduction process with a motor control. Namely, since a read magnification (the magnification ratio) α is inversely proportion to the scanning velocity in the sub-scanning direction Sv', when the reading magnification is set at 25%, which is the minimum magnification ratio, the scanning velocity Sv' in the sub-scanning direction becomes four times of the scanning velocity in the sub-scanning direction set for the non-magnification. Accordingly, the workload on the motor and driving circuit is large and it influences on the life of the apparatus. Further to this, vibration is posed due to high speed driving; consequently, it becomes necessary to provide a vibration-absorbing member to solve these problems described above.

(A2) Motor Control+Data Thinning-Out Control:

Since the scanning velocity in the sub-scanning direction Sv' comes high when only motor control is executed, actual operation and control of the image reading apparatus becomes difficult. Then when the magnification ratio falls in the range from 100% to 50%, the control section of the image reading apparatus executes the same control as the motor control of (A1). And when the magnification ratio falls in the range from 50% to 25%, the control section of the image reading apparatus executes data thinning-out control for thinning out the read data of every other line in the main scanning direction. Based on the data thinning-out control, when the magnification ratio falls in the range from 50% to 25%, the scanning velocity in the sub-scanning direction can be maintained in the same scanning velocity in the sub-scanning direction Sv' when the magnification ratio falls in the range from 100% to 50% (refer to (b) in FIG. 7). Namely, when the magnification ratio is set at 25% being the minimum magnification ratio, the scanning velocity in the sub-scanning direction Sv' becomes twice of the scanning velocity in the sub-scanning when the magnification ratio of real size. Consequently, the workload of the motor and driving circuit can be improved a little bit. However, due to the data thinning-out control, degradation of image quality occurs.

(A3) Motor Control+Data Thinning-Out Control+Extending Reading Cycle in the Main Scanning Direction:

In the case of the motor control+data thinning-out control described in (A2) above, it is necessary to increase the scanning velocity in the sub-scanning direction Sv' twice of the previous scanning velocity when setting the magnification ratio from 50% to 25%. Accordingly, even though the vibration is reduced comparing with the case of (1), however actual operation and control become difficult and still there is a problem that vibration occurs. Consequently, a technique for extending the main scanning direction reading cycle (image pickup element charge accumulation time) of the image pickup sensor such as a line sensor is newly introduced. Namely, even though the scanning velocity in the sub-scanning direction is kept constant by extending the main scanning direction reading cycle (extension factor β), the number of lines of the reading data in the main scanning direction becomes 1/β. This means that the reduction effect, which is the same effect obtained when the sub-scanning velocity becomes β times can be obtained. Accordingly, when the magnification ratio is in the range from 100% to 75%, the motor control described in (A1) above is executed; when the magnification ratio is in the range from 75% to 50%, the motor control+reading cycle extension are executed; when the magnification ratio is in the range from 50% to 37.5%, the motor control+selective data elimination is executed; and when the magnification ratio is in the range from 37.5% to 25%, the motor control+reading cycle extension+data thinning-out are executed (refer to (c) in FIG. 7). Here, when the reading cycle extension β is assumed 1.5, the scanning velocity Sv' in the sub-scanning direction becomes 1.5 times of the scanning velocity of a real size operation when the magnification ratio is 75%, 50%, 37.5% and 25% respectively. The minimum value of the scanning velocity in the sub-scanning direction is going to be as following when the extension factor β equal to 1.5. Since Sv' min=(Sv/0.75)·(1/β)=0.89, the Sv' min becomes 0.89 times of the scanning velocity of a real size operation.

(B) In the technique described above, according to the (A3), which utilize the extension of reading cycle, the scanning velocity Sv' in the sub-scanning direction by the motor control can be regulated and the maximum scanning velocity in the sub-scanning direction becomes 1.5 time of the scanning velocity of a real size operation. However, the light receiving amount of the image pickup sensor becomes β times of the light receiving amount when normal operation. Accordingly, there is a possibility that the light receiving element included in the image pickup sensor is saturated. Accordingly, it is necessary to reduce the intensity of emitting lights of a light emitting element array for irradiating the document to be read to about 1/β when the image pickup sensor read the document.

In the case of controlling the intensity of emitting lights, since shading characteristic changes as the amount of emitting lights and/or exposing time changes, it is necessary to specially provide shading correction data for conducting shading correction.

(C) As described above, since the coverage to be covered by only motor control is so wide that various problems involving mechanical issue occur. On the other hand, even though various controls are combined to make the coverage narrow, still mechanical controls remain. Further, it is still necessary to use various electrical controls together with the optical system controls. Accordingly, there is still a problem that the controls become complicated.

SUMMARY

An object of the present invention is to provide an image reading method and an image reading apparatus with an improvement over the abovementioned conventional method and apparatus. Another object of the present invention is to provide an image reading method and apparatus having a steady reduction function without conducting mechanically, electrically or optically complicated controls to solve the problems described above.

An image reading method according to one embodiment reflecting one aspect of the present invention is an image reading method for reading an image on a document including the steps of: reading cyclically the image in a main scanning direction with using an image pickup section, while relatively moving at least one of a light emitting section and the document irradiated by the light emitting section with a sub-scanning velocity in a sub-scanning direction perpendicular to the main scanning direction, against the image pickup section which comprises a plurality of light receiving elements in the main scanning direction; controlling, while the cyclic reading, a reading cycle in the main scanning direction to be inversely proportional to a magnification ratio; controlling, while the cyclic reading, light emitting intensity and light emitting period in the reading cycle to be constant irrespective of the magnification ratio; and controlling, while the cyclic reading, the sub-scanning velocity to be constant irrespective of the magnification ratio.

An image reading apparatus reflecting another aspect of the present invention includes: a light emitting section; a image pickup section for reading an image of a document irradiated by the light emitting section in a main scanning direction, the image pickup section having a plurality of light receiving elements in the main scanning direction; a main scanning driving section for repeatedly driving the image pickup section with a predetermined reading cycle; a sub-scanning driving section for allowing the image pickup section to read the document by relatively moving with a sub-scanning velocity at least one of the light emitting section and the document against the image pickup section in the sub-scanning direction perpendicular to the main scanning direction; and a control section for controlling a reading cycle in the main scanning direction to be inversely proportional to a magnification ratio, for controlling light emitting intensity and light emitting period in the reading cycle to be constant irrespective of the magnification ratio, and for controlling the sub-scanning velocity in the sub-scanning driving section to be constant irrespective of the magnification ratio.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

The preferred typical embodiments (hereinafter each will be called an embodiment) to practice the present invention will be described by referring to drawings below.

The present invention can be applied to, but not limited to, an image reading apparatus for reading image data of the contents of a document as image data and outputting the image data, an image forming apparatus (a copier) having a function for reading the contents of the object to be copied (a document) by a document reader (a scanner), and even an image transmitting apparatus (a facsimile apparatus) for reading the contents of the object to be transmitted (a document) by a document reading section (a scanner) and transmitting them through communication network.

In this embodiment, described will be an image reading method and an image reading apparatus having a light emitting section including a plurality of light emitting elements in the main scanning direction, an image pickup sensor for reading in the main scanning direction an image on a document irradiated by the light emitting section, and a scan driving section for reading the image on the document by relatively moving the light emitting section and the image pickup sensor against the document in a sub-scanning direction being perpendicular to the main scanning direction.

<A Mechanical Configuration of the Image Reading Apparatus>

Firstly, a mechanical configuration of the image reading apparatus of the present embodiment will be described by referring to FIG. 2. Hereinafter, an image reading apparatus 100 having a function for generating image data by reading an image of a document placed on a platen glass or a document automatically fed and conveyed, will be used as an typical example of the embodiment.

Figure 2:
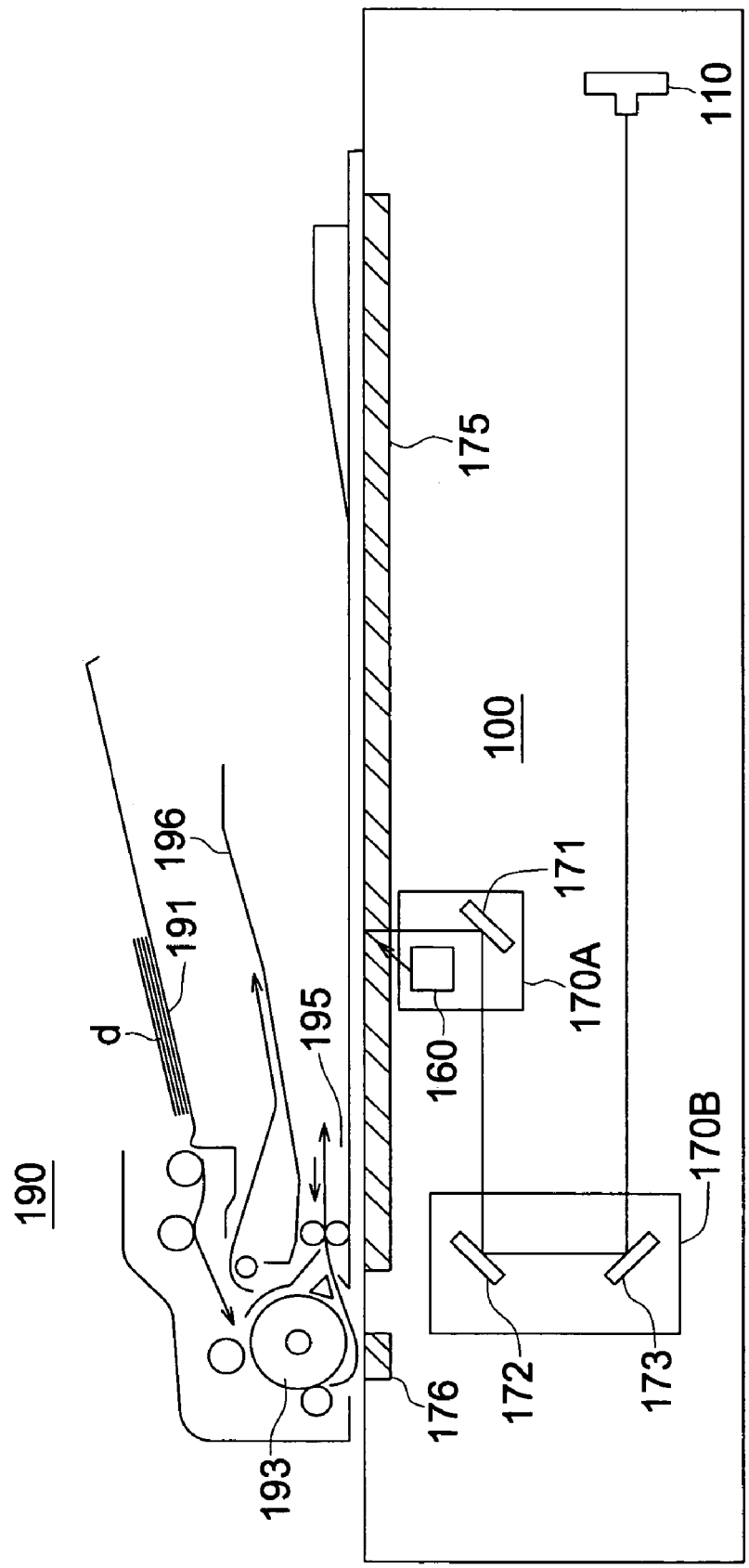
FIG. 2 is a block diagram illustrating a mechanical configuration of the image reading apparatus of the embodiment of the present invention.

A light emitting element array 160 being a light source having a elongated shape in the direction perpendicular to the paper face of the sheet on which this FIG. 2 is drawn (the main scanning direction) irradiates the surface on which the image is recorded of the document placed on the platen glass 175. The light reflected by the document is focused on the light receiving surface of a sensor section 110 being an image pickup sensor through mirrors 171, 172 and 173, and a image forming optical system.

The light emitting element array 160 is a light emitting section having a plurality of light emitting element groups in the main scanning direction (the direction perpendicular to the surface of the paper sheet on which FIG. 2 is drawn), each light emitting group including a plurality of light emitting elements such as LEDs and organic EL elements, the light emitting element array 160 having an elongated shape in the main scanning direction. In this embodiment, in order to conduct light emitting period control, which will be described later, it is preferable to employ LEDs and or organic EL element(s) having high-speed response, instead of a light bulb type light source such as a halogen lamp as a light source. In the case of an organic EL element, if the organic EL element itself has an elongated shape, it is not always necessary to dispose plural elements in the main scanning direction. In the case that an optical shutter apparatus (for example, a PLZT optical shutter apparatus) is used along with the light source, a halogen lamp can be used as the light source.

A sensor 110 is an image pickup sensor for reading the image on the document irradiated by the light emitting element array 160 in the main scanning direction. A line sensor such as a CCD or CMOS type in which a plurality of light receiving elements are disposed configures the sensor 110.

In FIG. 2, when the document is placed so that the surface of the document to be read is faced with the platen glass 175, scanning units 170A and 170B scan the document along with the platen glass 175 and read the image of one side of the document.

In FIG. 2, numeral 190 is an automatic document feeder (hereinafter it will be called ADF) being a unit for feeding a document to read one side or dual sides of the document. A plurality of documents d is placed on the document table 191 of ADF 190 capable of feeding the document having an image to be read on both surfaces of the document with the surface of the first page document on which the image is recorded facing toward upside. The document proceeded by the ADF feeding roller is conveyed by the ADF roller 193. At this moment of time, the light emitting element array 160 positioned under the second platen glass 176 irradiates the light onto the document surface of the document d. The reflected light passed through the mirrors 171, 172 and 173 is focused and forms an image on the receiving surface of the sensor 110.

In FIG. 2, in the case that the document d is placed on the platen glass 175 with the surface to be read facing with downside, an optical system (the scanning units 170A and 170B) scans the document d along the platen glass 175. When the document d is automatically fed by the ADF 190 and moved around the roller 193, the scanning unit 170A moves under the second platen glass to read the document d. Here, the moving velocity of the scanning unit 170A or the rotational velocity of the roller surface of the ADF feeding roller 193 corresponds to the sub-scanning velocity of the embodiment of the present invention.

<An Electrical Configuration of the Image Reading Apparatus>

Figure 1:
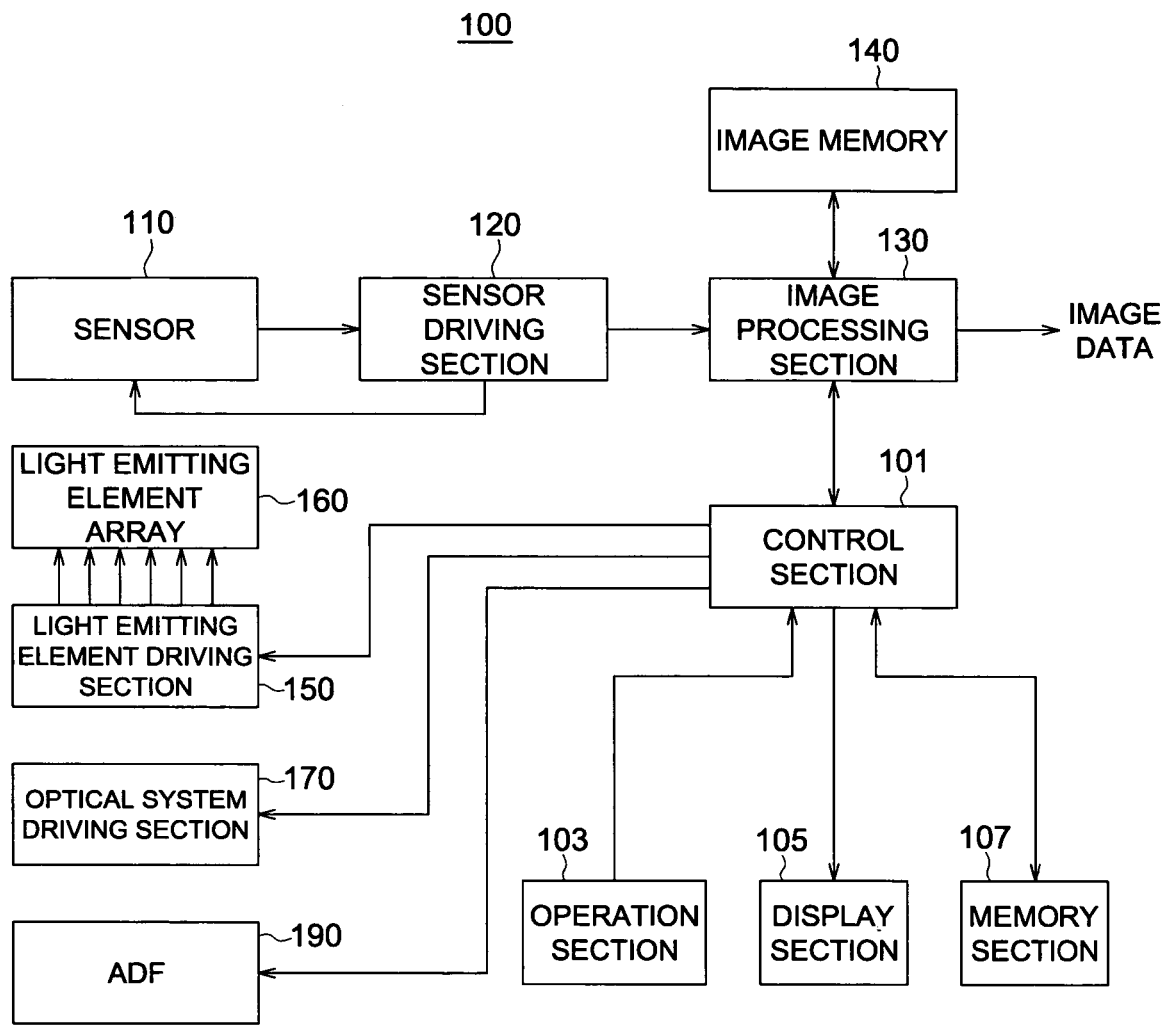
FIG. 1 is a functional block diagram illustrating an electrical configuration of an image reading apparatus of the embodiment of the present invention.

FIG. 1 is a functional block diagram illustrating a detailed configuration of an image reading apparatus of the present embodiment. FIG. 1 illustrates the circumference sections of a part of the image reading apparatus, which is necessary for the explanation of operation regarding the present embodiment, and the other parts are omitted.

Numeral 101 is a control section for controlling each part of an image reading apparatus 100. The control section 101 controls the sensor 110 to read an image on the document irradiated by the light emitting element array 160. At the same time the controller 101 controls a reading cycle in the main scanning direction at the sensor 110 so that the reading cycle is inversely proportion to the magnification ratio when the sensor 110 reads the image on the document by relatively moving the light emitting element array 160 and the sensor 110 against the document in the sub-scanning direction being in the direction perpendicular to the main scanning direction. Further, the control section 101 controls the light emitting intensity and the light emitting period of the light emitting element array 160 in one reading cycle to be constant and the sub-scanning velocity to be constant irrespective of the magnification ratio.

Numeral 103 is an operation section for conducting various inputs operations such as a document size and start of reading operation. Numeral 105 is a display section of the image reading apparatus, which displays various states of the image reading apparatus and various messages through characters, numeric codes and pictorial symbols. The display section 105 outputs messages in voice and in blinking signals when it is necessary. The operation section 103 and the display section 105 may be uniformly configured by a touch panel style. Numeral 107 is a memory section for memorizing shading correction data and various setting data.

Numeral 110 is an image pickup sensor for reading the image on the document irradiated by the light emitting element array 160 in the main scanning direction. The image pickup sensor 110 is a line sensor configured by such as a CCD (Charge Coupled Device) and a CIS (CMOS Image Sensor) in which a plurality of receiving light elements is disposed in the main scanning direction.

Numeral 120 is a sensor driving section for driving sensor 110, processing electronic charges outputted from the sensor 110 and generating image data.

Numeral 130 is an image processing section for executing various image processings of image data outputted from the sensor driving section 120. Numeral 140 denotes an image memory for memorizing the image data processed in the image processing section 130. Image data outputted from the image processing section 130 is transmitted to an external apparatus under the control of the control section 101 through an interface as a communication section (not shown).

Numeral 150 denotes a light emitting element driving section for controlling the light emitting strength and a light emitting period in a reading cycle to be constant irrespective of the magnification ratio.

Numeral 160 denotes a light emitting element array having a plurality of light emitting element groups in the main scanning direction including a plurality of light emitting elements as a light emitting section. The light emitting element driving section 150 drives the light emitting element array 160 for switching light emitting and non-light emitting.

Numeral 170 denotes an optical system driving section and the scanning units 170A and 170B read the image on the one side of the document while scanning the document along with the platen glass. At this time, the scanning unit 170A moves in the sub-scanning direction at a half velocity of the scanning unit 170B so that the distance (an optical path length) from the document to the sensor 110 is kept a constant length. Consequently, the optical focal distance can be kept constant.

Numeral 190 denotes an automatic document feeder (ADF) for feeding a document having a single surface or dual surfaces to be read. The control section 101 controls an ADF feeding roller 193 to rotate at a predetermined rotational velocity and feed the document at a predetermined feeding velocity (sub-scanning velocity).

Operational States of the First Embodiment

The detailed operation of the image reading apparatus of the present embodiment will be described below by referring to the time chart illustrated in FIG. 3 and drawings illustrated in FIG. 4 and onward. Further the process of the image reading method will be described through the operation of the image reading apparatus below.

The magnification ratio $\alpha$ when reading the document will be determined by the control section 101 prior to the commence of reading a document by checking following information. The control section 101 checks whether the magnification ratio has been inputted through the operation section 103 when reading the document, whether there is an instruction to specify the magnification ratio from a computer (not shown) connected with network, whether the size of a document and the output sheet has been specified through the operation section 103 or whether the document size is automatically obtained by pre-scanning operation.

When magnification ratio $\alpha$ is determined as described above, the control section 101 sets an extension factor $\beta$ when extending the reading cycle Th of the sensor 110 in response to the magnification ratio $\alpha$. In the embodiment of the present invention, a case when the magnification is reduction will be described below.

A reading cycle in the main scanning direction Th means a time period, within which the sensor 110 needs to read one main scanning line by relatively moving the light emitting element array 160 and the sensor 110 against the document in the sub-scanning direction perpendicular to the main scanning direction when reading an image on the document. Namely, in this embodiment, the reading cycle in main scanning direction Th means a time being an charge accumulating time of one main scanning line.

Here, the main scanning direction reading cycle determined in respond to the magnification ratio Th' is expressed by a formula $Th'=\beta \cdot Th=(1/\alpha) \cdot Th$. Namely, in this embodiment, the phrase "in response to the magnification ratio" means "being inversely proportion to the magnification ratio".

Figure 3:
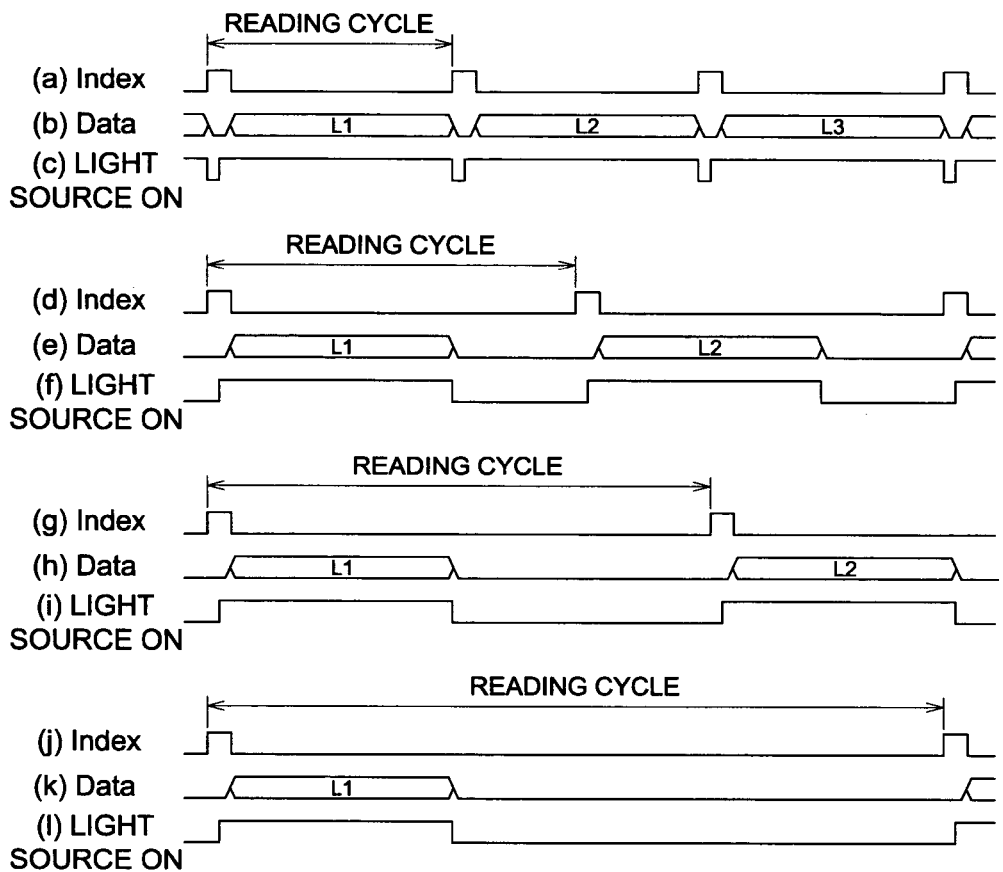
FIG. 3 is a timing chart illustrating a processing operation when reading an image in the first embodiment of the present invention.

For example, when the reduction is 66%, namely the magnification ratio $\alpha$ is 0.66, the main scanning direction reading cycle Th' is calculated by a formula of Th (refer to (a) in FIG. 3)/0.66. As a result, the main scanning direction reading cycle Th' is extended by a factor of 1.5. And when the reduction is 50% and the magnification ratio is 0.5, the main scanning direction reading cycle Th' is calculated by a formula of Th/0.5, namely the main scanning direction reading cycle Th' is extended by a factor of 2, (two times, refer to (g) in FIG. 3). Further when the reduction is 33% and the magnification ratio is 0.33, the main scanning direction reading cycle Th' is calculated by a formula of Th/0.33, namely the main scanning direction reading cycle Th' is extended by a factor of 3.0, (three times, refer to (j) in FIG. 3).

As described above, when extending the main scanning direction reading cycle (the extension factor $\beta$), the number of reading data line in the main scanning direction becomes $1/\beta$ even though the scanning velocity in the sub-scanning direction is constant. This means that the same reduction effect obtained when the sub-scanning velocity becomes $\beta$ times can be obtained.

Figure 4:
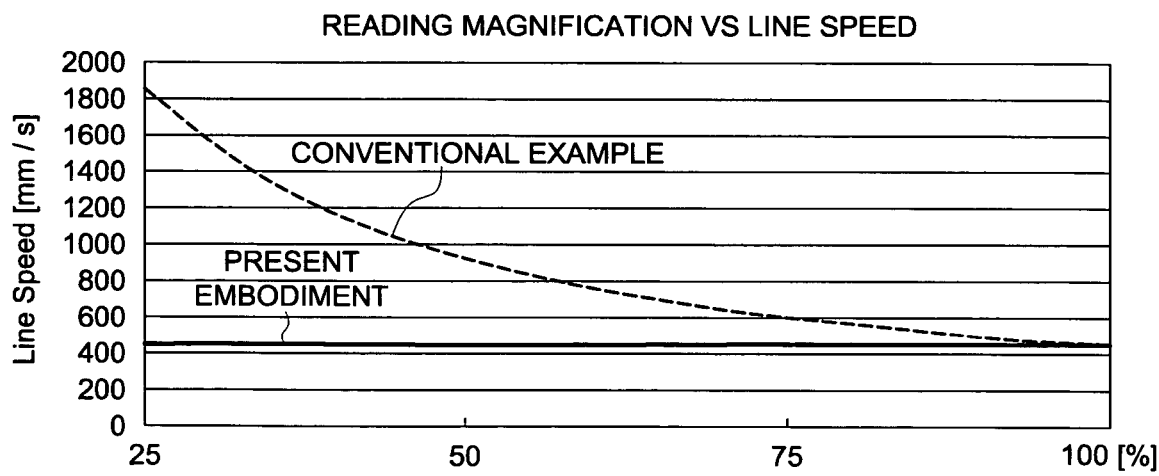
FIG. 4 is a graph illustrating the relationship between the magnification ratio and the reading cycle in the main scanning direction in the embodiment of the present invention.

Namely, in this embodiment the control section 101 controls the sub-scanning velocity Sv to be constant as illustrated in a solid line in FIG. 4 irrespective of the magnification ratio. Dotted line in FIG. 4 denotes the sub-scanning velocity Sv' in the conventional motor control. By controlling the sub-scanning velocity to be constant irrespective of the magnification ratio, it is not necessary to provide complicated mechanical control and counter measure for responding to the wide range of vibration frequencies.

In the case of conventional control method, the amount of lights received by the sensor 110 becomes amount of lights being $\beta$ times of normal amount of lights. Accordingly, there was a possibility that a light receiving element became saturated. Consequently, it was necessary to reduce the intensity of light emitted from the light emitting element array 160 to about $1/\beta$. Due to the restriction of the intensity control of the lights, it was impossible to extend the reading cycle in the main scanning reading direction across over the all magnification ratios.

In the present embodiment, when extending the main scanning direction reading cycle in response to the magnification ratio when reducing the size, the control section controls the intensity of lights of the light emitting element array 160 to be constant irrespective of the magnification ratio, and controls the light emitting period of the light emitting element array 160 in one reading cycle constant irrespective of the magnification ratio (refer to (c), (f), (i) and (l) in FIG. 3). Based on the control of the light emitting period, even though the main scanning direction reading cycle Th' is extended, the receiving light amount in one reading cycle does not change, the receiving element is not saturated in response to the magnification ratio and it is not necessary to change the light emitting intensity of the light emitting element array 160.

Figure 5:
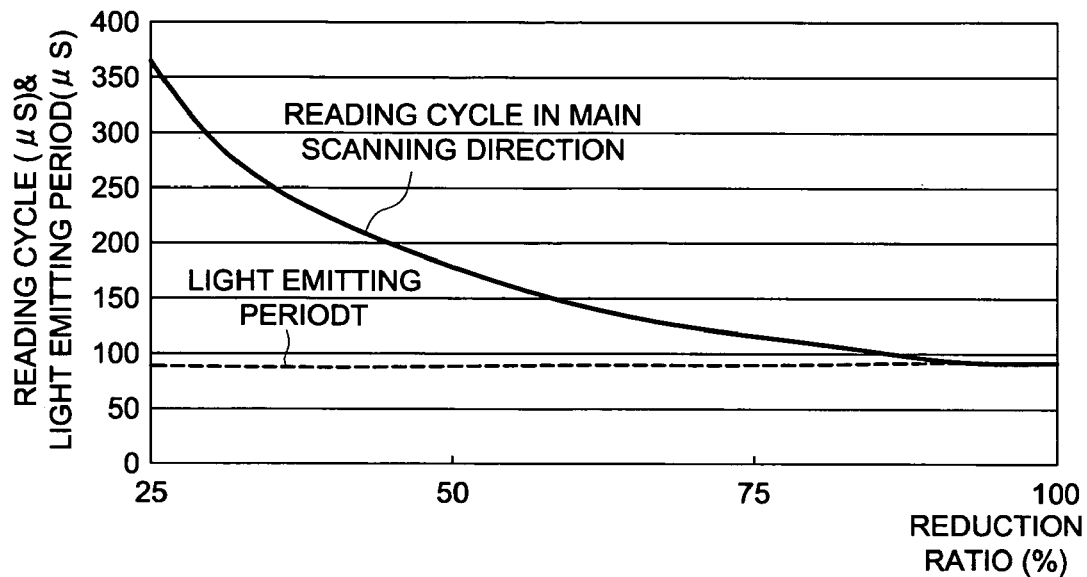
FIG. 5 is a graph illustrating the relationship between the magnification ratio and the scanning velocity in the sub-scanning direction in the embodiment of the present invention.

A solid line in FIG. 5 illustrates the main scanning direction reading cycle in terms of the magnification ratio in the present embodiment. A dotted line in FIG. 5 illustrates the light emitting period of the light emitting element array 160 in one main scanning direction reading cycle in the present embodiment.

Since the intensity of emitting lights of the light emitting element array 160 is controlled constant, in addition to the fact that the a driving circuit for controlling the change of the intensity of emitting light and the control sequence are not necessary, it is not necessary to provide a plurality of shading correction data.

The light emitting period control in one reading cycle of the light emitting element array 160 described above may be included in a light emitting driving section 150 or may be included in a shutter section (not shown) disposed in the output side of the light emitting element array 160. With regard to the shutter section, various kinds of shutter may be used as long as the shutter controls the pass and the block of the output of the lights.

An image processing section 130 reduces the main scanning direction reading data obtained by the sensor 110 in response to the magnification ratio. The image processing section 130 does not apply the special process such as selective elimination of data on the sub-scanning direction reading data. The sub-scanning direction reading data is outputted as reduced size image data.

As a result of the controls described above, the motor velocity change is not necessary in the optical system driving section 170 and the change of the intensity of emitting lights of the light emitting element array 160 is not necessary. Further, it is not necessary to combine the complicated plural controls such as the scanning velocity control in the sub-scanning direction and the control of data thinning-out. Accordingly, it becomes possible to realize a steady reduction function.

The Second Embodiment

In the first embodiment described above, when extending the main scanning direction reading cycle in response to the magnification ratio when reducing the size, the control section 101 controlled the intensity of lights emitted from the light emitting element array 160 to be constant irrespective of the magnification ratio, and at the same time controlled the light emitting period in a reading cycle of the light emitting element array 160 irrespective of the magnification ratio as illustrated in (c), (f), (i) and (l) in FIG. 3.

Figure 6:
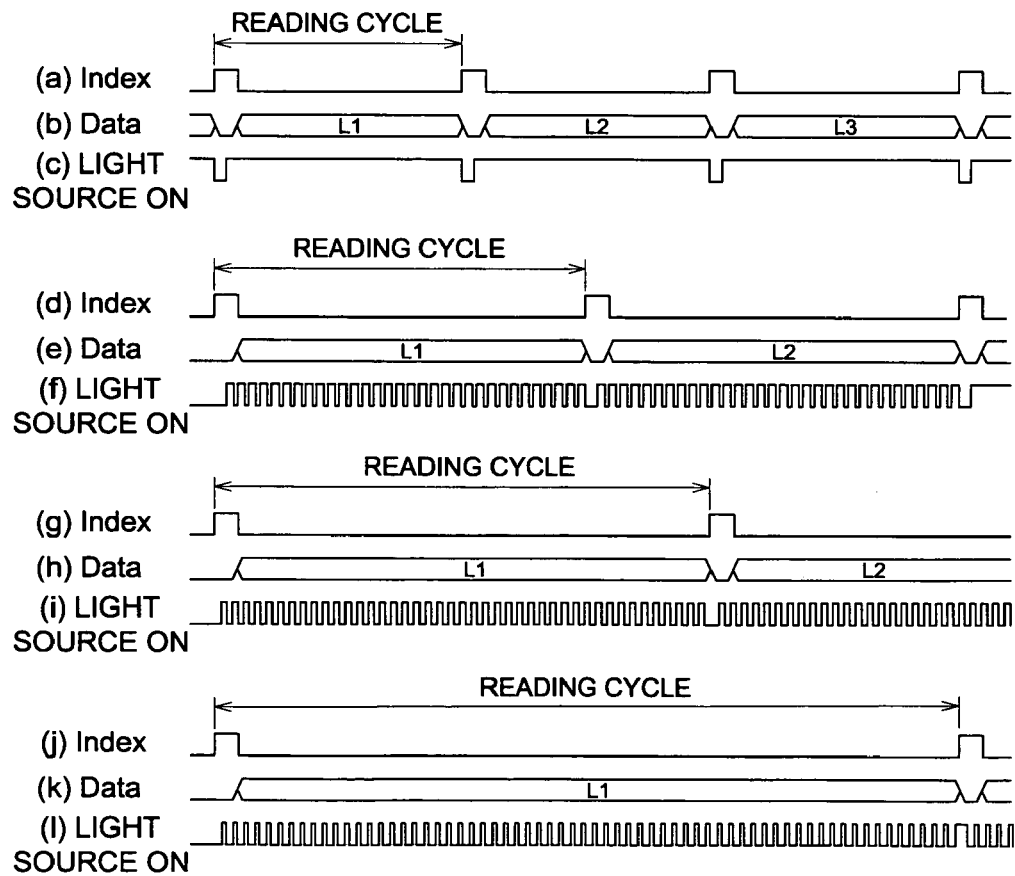
FIG. 6 is a timing chart illustrating a processing operation when reading an image in the second embodiment of the present invention.
Figure 7:
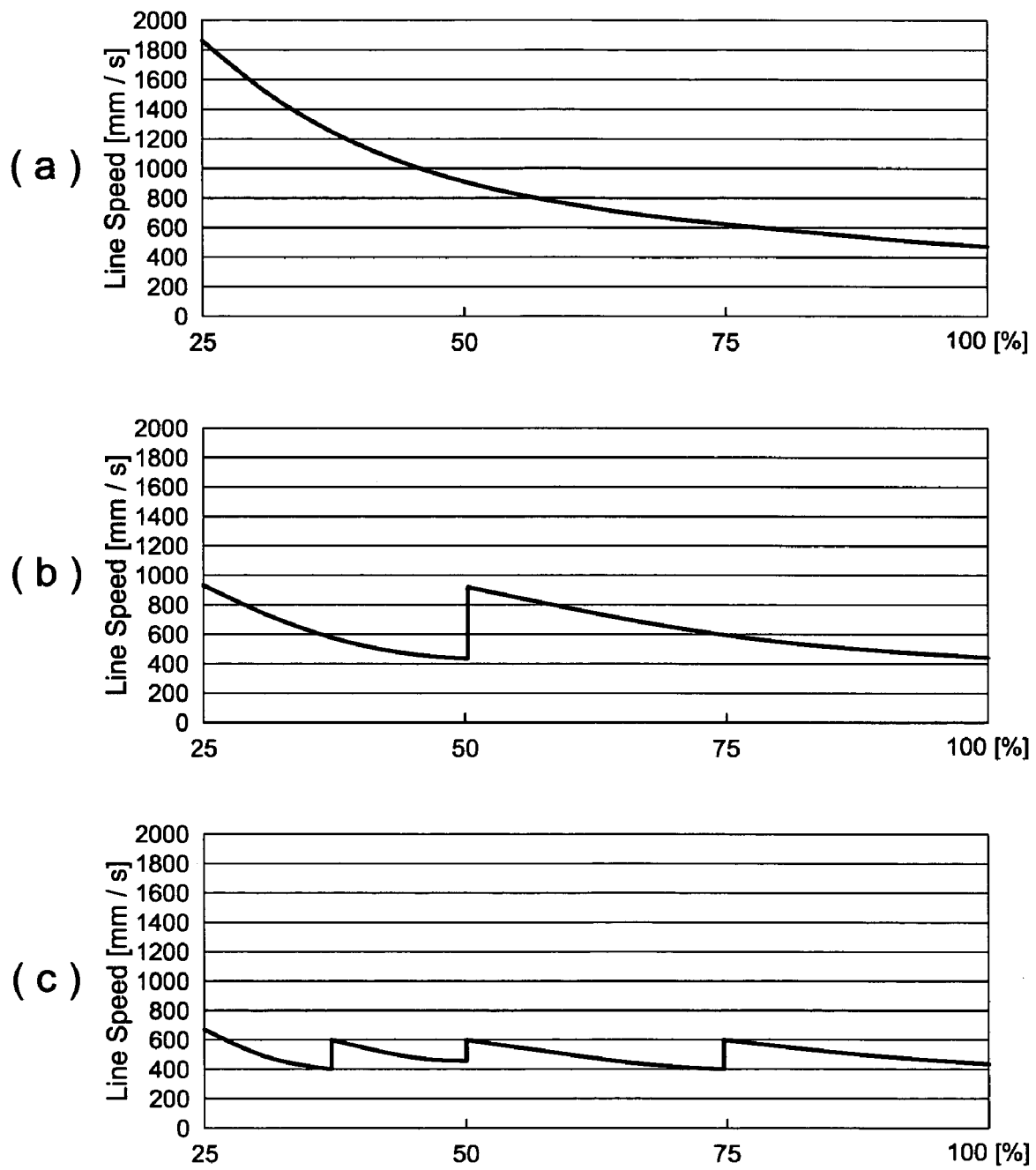
FIG. 7 shows graphs illustrating the relationship between the magnification ratio and the scanning velocity in the sub-scanning direction in prior art.

On the other hand, when extending the main scanning direction reading cycle in response to the magnification ratio when reducing the size, it is possible to control the emitting time of the light emitting element array 160 to be constant in a reading cycle and at the same time, controls the intensity of emitting lights of the light emitting element array 160 to be constant as effective amount of lights by executing PWM (Pulse Width Modulation) in one reading cycle irrespective of the magnification ratio (refer to (C), (f), (i) and (l) in FIG. 6.)

Here, in the case of (c) in FIG. 6, it is assumed that the magnification ratio is 100% (no reduction), the main scanning direction reading cycle is 100% and a light emission duty is 100%. The case of (f) in FIG. 6 illustrates the state that the magnification ratio is 66%, the main scanning direction reading cycle is 150% and the light emission duty is 75%. The case of (i) in FIG. 6 illustrates the state that the magnification ratio is 50%, the main scanning direction reading cycle is 200% and the light emission duty is 50%. Further, the case of (l) in FIG. 6 illustrates the state that the magnification ratio is 33%, the main scanning direction reading cycle is 300% and the light emission duty is 33%.

Based on the control of the effective light emitting period by the PWM control, even though the main scanning direction reading cycle Th' is extended in response to the magnification ratio when reducing the size of the image, the receiving light amount in one reading cycle does not change, the receiving element is not saturated in response to the magnification ratio and it is not necessary to change the light emitting intensity of the light emitting element array 160.

Further, by controlling the sub-scanning velocity constant irrespective of the magnification ratio, it is not necessary to provide the countermeasure for vibration in response to the wide vibration frequency range. Further, since the intensity of emitting lights is controlled constant, the control for changing the intensity of emitting lights is not necessary. In addition, it is not necessary to provide a plurality of shading correction data.

As a result of the controls described above, the motor velocity change is not necessary in the optical system driving section 170 and the change of the intensity of emitting lights of the light emitting element array 160 is not necessary. Further, it is not necessary to combine the complicated plural controls such as the scanning velocity control in the sub-scanning direction and the control of data thinning-out. Accordingly, it becomes possible to realize a steady reduction function.

The Other Embodiment (1)

The embodiments described above are explained based on the application of an image reading apparatus. However, it becomes possible to realize the same effects on a copier and a facsimile machine having the image reading apparatus by applying the controls and the processes described above.

The Other Embodiment (2)

The embodiments described above are explained based on the application of an image reading apparatus in which a document is placed on the platen glass. However, it becomes also possible to apply the embodiment described above on the various image reading apparatus, for example, such as a film scanner for scanning photographic films and an open book scanner for scanning a document placed with the face up state from upside.

The Other Embodiment (3)

In the embodiments of the present invention described above, described are examples in which when the magnification ratio is 100% (real size), no reading cycle extension is assigned, and when reducing the size, the main scanning direction reading cycle is extended.

Other than these embodiments described above, it becomes possible to apply the control described in the first embodiment by having set that the main scanning direction reading cycle can be extended by several % when magnification ratio is 100%, (the control being that the main scanning direction reading cycle is extended in response to the magnification ratio; control section 101 controls the intensity of emitting lights of the light emitting element array 160 to be constant irrespective of the magnification ratio; and the control section 101 controls the light emitting period of the light emitting element array 160 in one reading cycle to be constant irrespective of the magnification ratio).

In these embodiments described above, an image pickup sensor reads the image on the document by cyclically reading the document in the main scanning direction while moving at least one of a light emitting element array and the document irradiated by the light emitting element against the image pickup sensor having a plurality of light receiving elements, in the sub-scanning direction being perpendicular to the main scanning direction. At that time, a control section controls the reading cycle in the main scanning direction of the image pickup sensor to be inversely proportion to the magnification ratio, controls the intensity of emitting lights and the light emitting period in one reading cycle of the light emitting element array constant irrespective of the magnification ratio and controls the sub-scanning velocity constant irrespective of the magnification ratio.

The magnification ratio described above is a reduction rate having a magnification rate of less than 1.0. The control of the light emitting period is a control of time within which the light is turned on in a reading cycle of the main scanning direction, the reading cycle being controlled to be inversely proportion to the magnification ratio. Here, the light emitting period control can be executed by a control by pulse width modulation (PWM) of the light emitting element and/or a control by the shutter provided with the light emitting element.

Here, by controlling the main scanning direction reading cycle of the image pickup sensor to be inversely proportion to the magnification ratio, when the magnification is a reduction operation, even though the sub-scanning velocity is constant, due to the extension of the main scanning direction reading cycle (the extension factor β), the number of lines in the main scanning direction reading data becomes 1/β. This means that the same reduction effect obtained when the sub-scanning velocity becomes β times can be obtained.

Further, by controlling the intensity of emitting lights of the light emitting element and the light emitting period in a reading cycle to be constant, the image pickup sensor is not saturated by the extension of the reading cycle. In addition to this, by controlling the sub-scanning velocity to be constant irrespective of the magnification ratio, it is not necessary to provide a complicated mechanical control and a vibration countermeasure to respond the wide range of vibration frequencies. Further, since the intensity of emitting lights of the light emitting element array is arranged to be constant, the control for changing the intensity of emitting lights is not necessary. In addition, it becomes unnecessary to provide a plurality of shading correction data.

As a result, it is not necessary to change the motor velocity, to change the intensity of emitting lights and to combine plural kinds of complicated controls, such as, scanning velocity in the sub-scanning direction. It is possible to realize an image reading apparatus having a stable function for reducing the size.

What is claimed is:

1. An image reading method for reading an image on a document, comprising:
   cyclically reading the image in a main scanning direction by using an image pickup section, while relatively moving at least one of a light emitting section and the document irradiated by the light emitting section with a sub-scanning velocity in a sub-scanning direction perpendicular to the main scanning direction, with respect to the image pickup section which comprises a plurality of light receiving elements arranged in the main scanning direction;
   controlling, while performing the cyclic reading, a reading cycle in the main scanning direction to be inversely proportional to a magnification ratio, wherein the reading cycle is a time period within which the plurality of light receiving elements read one main scanning line of the image in the main scanning direction;
   controlling, while performing the cyclic reading, a light emitting intensity and a light emitting period of the light emitting section in the reading cycle to be constant irrespective of the magnification ratio; and
   controlling, while performing the cyclic reading, the sub-scanning velocity to be constant irrespective of the magnification ratio.

2. The image reading method of claim 1, wherein the magnification ratio is an image reduction ratio.

3. The image reading method of claim 1, wherein the controlling of the light emitting period is executed by controlling a time period during which light emission is turned on in the reading cycle in the main scanning direction, the reading cycle being controlled to be inversely proportional to the magnification ratio.

4. The image reading method of claim 3, wherein the light emitting section comprises one of a LED element and an organic EL element, and wherein the controlling of the light emitting period is executed by a pulse width modulation (PWM) control of the light emitting section.

5. The image reading method of claim 1, wherein the plurality of light receiving elements are comprised by one of a CCD sensor and a CMOS sensor, and the reading cycle in the main scanning direction is a charge accumulating time period of one main scanning line.

6. An image reading apparatus comprising:
   a light emitting section;
   an image pickup section for reading an image of a document irradiated by the light emitting section in a main scanning direction, the image pickup section comprising a plurality of light receiving elements arranged in the main scanning direction;
   a main scanning driving section for repeatedly driving the plurality of light receiving elements of the image pickup section with a predetermined reading cycle, wherein the reading cycle is a time period within which the plurality of light receiving elements read one main scanning line of the image in the main scanning direction;
   a sub-scanning driving section for allowing the image pickup section to read the document by relatively moving with a sub-scanning velocity at least one of the light emitting section and the document with respect to the image pickup section in a sub-scanning direction perpendicular to the main scanning direction; and
   a control section for controlling the reading cycle in the main scanning direction to be inversely proportional to a magnification ratio, controlling a light emitting intensity and a light emitting period of the light emitting section in the reading cycle to be constant irrespective of the magnification ratio, and controlling the sub-scanning velocity in the sub-scanning driving section to be constant irrespective of the magnification ratio.

7. The image reading apparatus of claim 6, wherein the magnification ratio is an image reduction ratio.

8. The image reading apparatus of claim 6, wherein the control section controls the light emitting period by controlling a time period during which light emission is turned on in the reading cycle in the main scanning direction, the reading cycle being controlled to be inversely proportional to the magnification ratio.

9. The image reading apparatus of claim 8, wherein the light emitting section comprises one of a LED element and an organic EL element, and wherein the control section controls the light emitting period by a pulse width modulation (PWM) control of the light emitting section.

10. The image reading apparatus of claim 6, wherein the plurality of light receiving elements are comprised by one of a CCD sensor and a CMOS sensor, and the reading cycle in the main scanning direction is a charge accumulating time period of one main scanning line.

* * * * *